Figure 1:
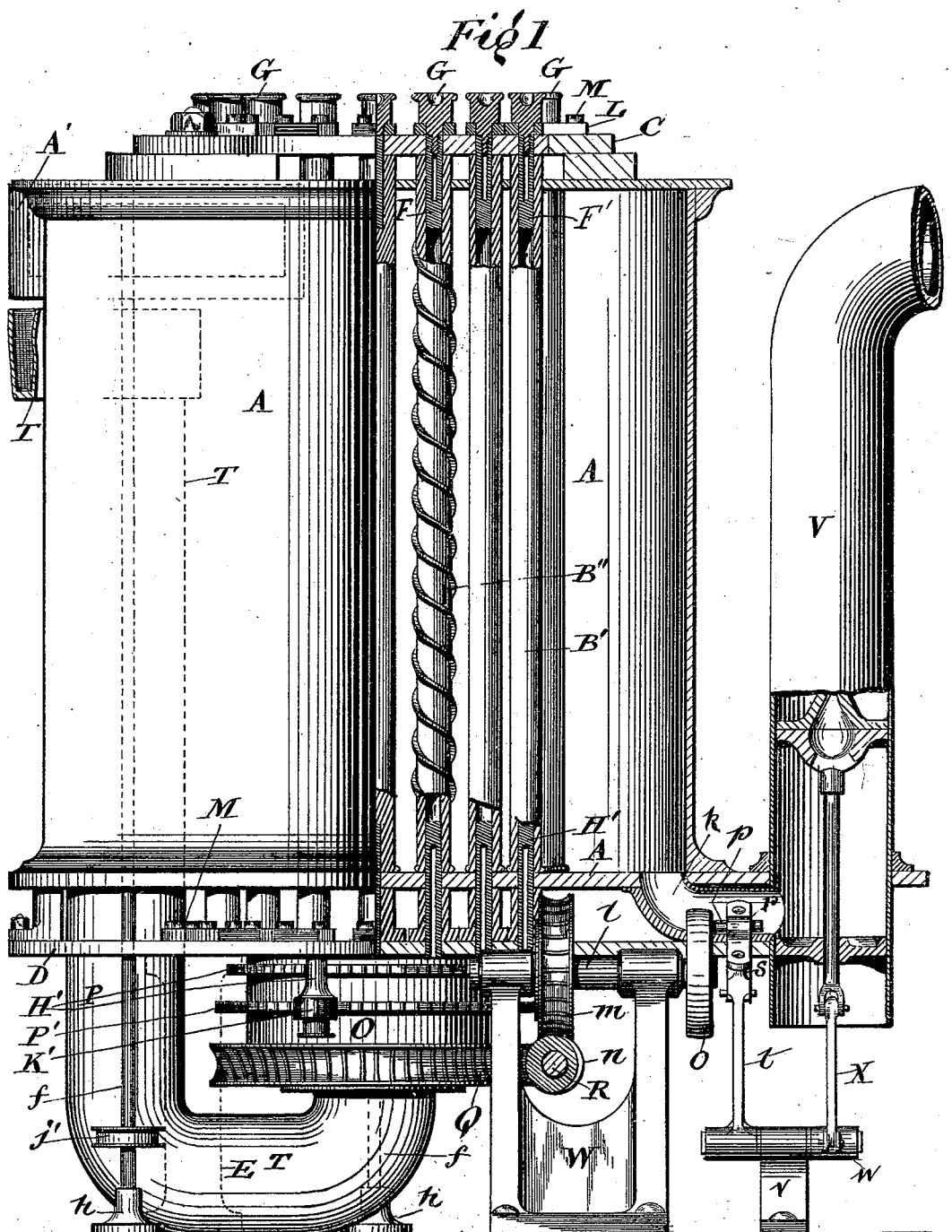

(No Model.) 5 Sheets—Sheet 4.

T. TORRANCE & J. H. HOWELL.
MACHINE FOR STRAINING PAPER PULP, &c.

No. 553,945. Patented Feb. 4, 1896.

Witnesses
H. van Oldenneel
E. A. Scott

Inventors
Thomas Torrance
James Henry Howell
by Richardson
Attorney (No Model.) 5 Sheets—Sheet 5.

T. TORRANCE & J. H. HOWELL.
MACHINE FOR STRAINING PAPER PULP, &c.

No. 553,945. Patented Feb. 4, 1896.

Witnesses
H. van Oldenneel
E. A. Scott

Inventors
Thomas Torrance
James Henry Howell
by Richardson
Attorneys

ANDREW B.GRAHAM. PHOTO-LITHO. WASHINGTON.D.C.

UNITED STATES PATENT OFFICE.

THOMAS TORRANCE, OF BITTON, AND JAMES HENRY HOWELL, OF BRISTOL, ENGLAND.

MACHINE FOR STRAINING PAPER-PULP, &c.

SPECIFICATION forming part of Letters Patent No. 553,945, dated February 4, 1896.

Application filed June 8, 1895. Serial No. 552,186. (No model.) Patented in England June 9, 1894, No. 11,206.

*To all whom it may concern:*

Be it known that we, THOMAS TORRANCE, of Bitton, and JAMES HENRY HOWELL, of 104 Pembroke Road, Clifton, Bristol, in the county of Gloucester, England, subjects of Her Majesty the Queen of Great Britain, have invented certain new and useful Improvements in Machines for Straining Paper-Pulp and other Fluid or Semifluid Substances, (for which we have made and received certificate of acceptance of an application for a patent in Great Britain, No. 11,206, dated June 9, 1894,) of which the following is a specification.

Our invention relates to an improved machine or apparatus for perfectly and effectually straining and otherwise purifying all kinds of pulp used in paper-making after leaving the beaters and before entering upon the paper-making machine, by removing therefrom what is technically known as "knots" and such other foreign matter as would be objectionable or detrimental to the desired texture or finish of the paper. The same machine or apparatus according to our invention (although hereinafter described and shown in connection with the before-and mentioned treatment of paper-pulp) may also be employed as a straining or purifying medium for almost any and every kind of fluid or semifluid substance, among which may be specially mentioned wines, tinctures and the like.

Our present invention is based upon the same principle as that of the machines or apparatus invented by us, and forming the subject-matter of a previous patent in the United States of America, No. 535,471, dated March 5, 1895, and relates to certain and important modifications, improvements and simplification of the parts, and the methods and means for operating the same, described and shown in the specification and drawings of our said previous patent, by which we are enabled to attain as great or greater efficiency, relatively thereto, with a machine or apparatus of less dimensions and fewer working parts.

Figure 2:
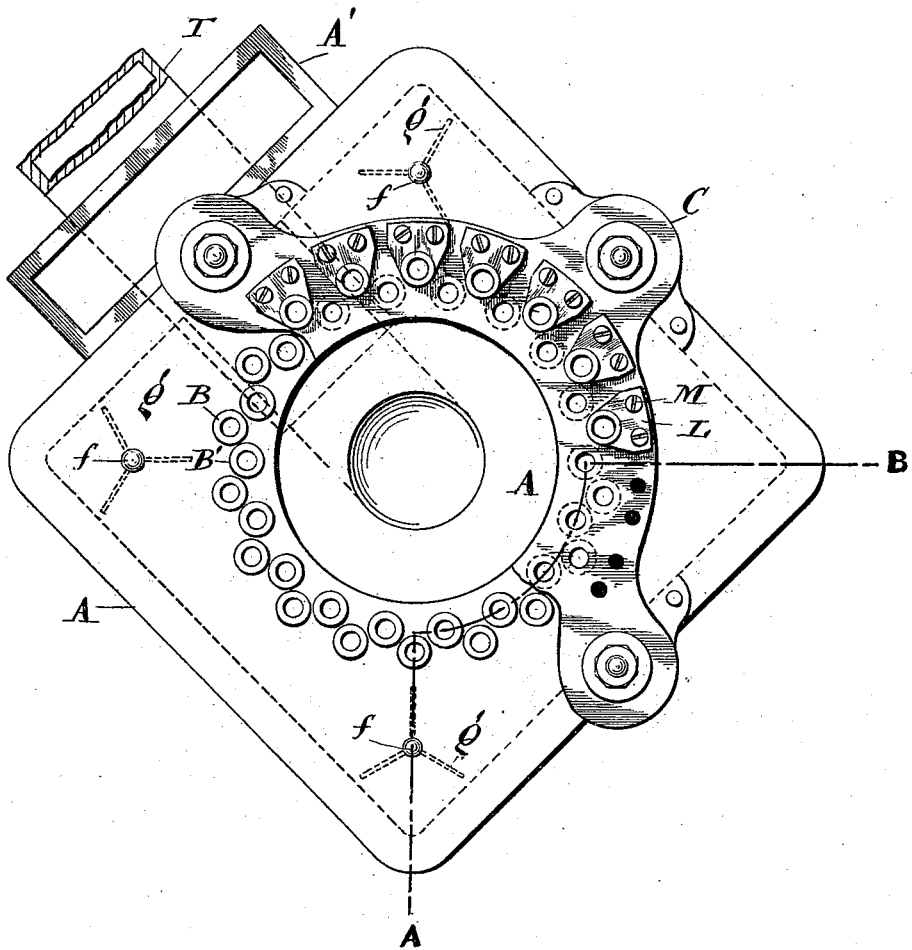
Figure 3:
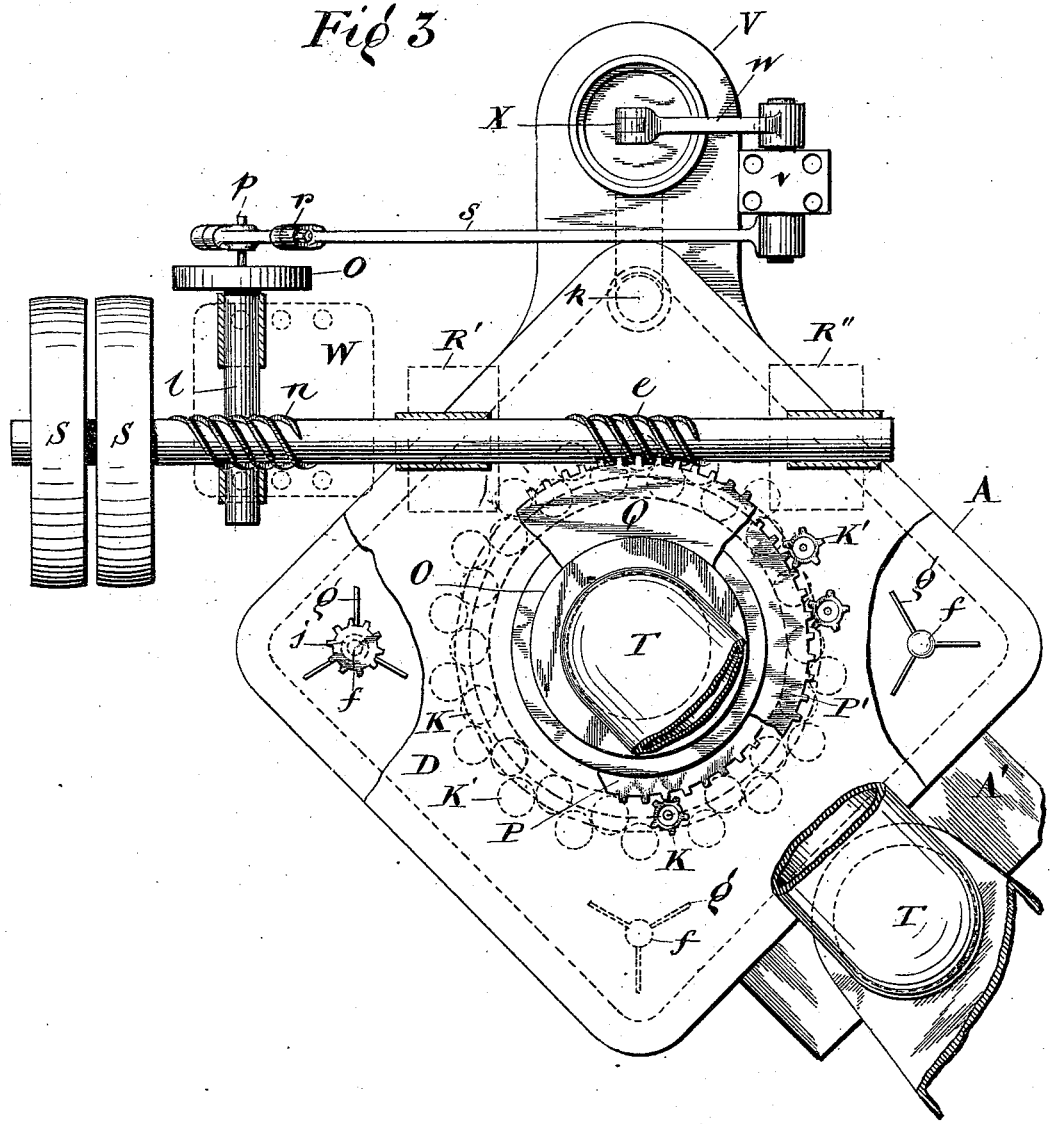
Figure 4:
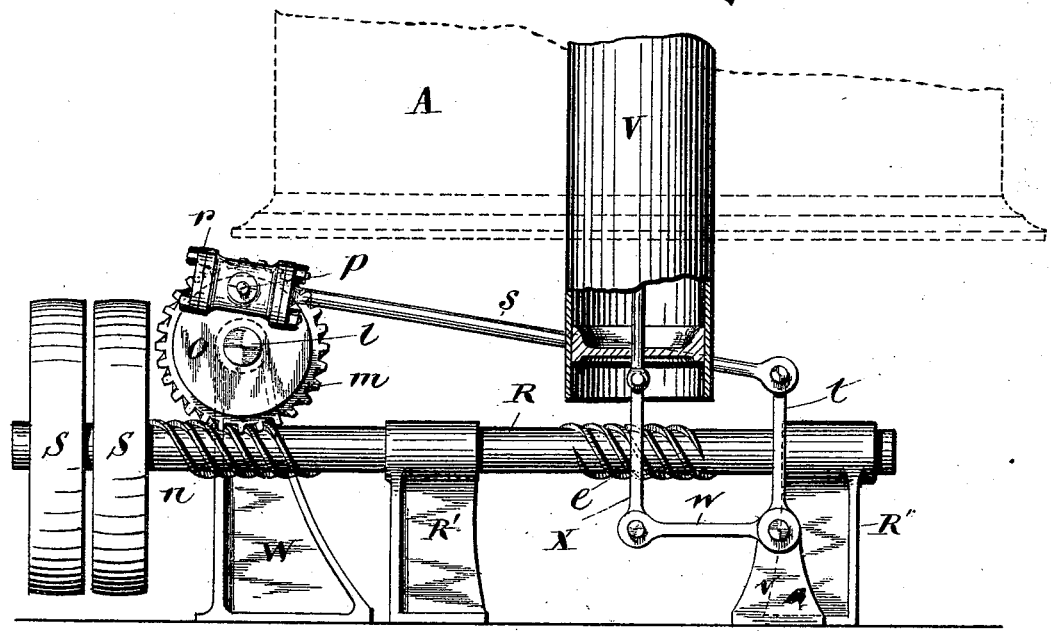
Figure 5:
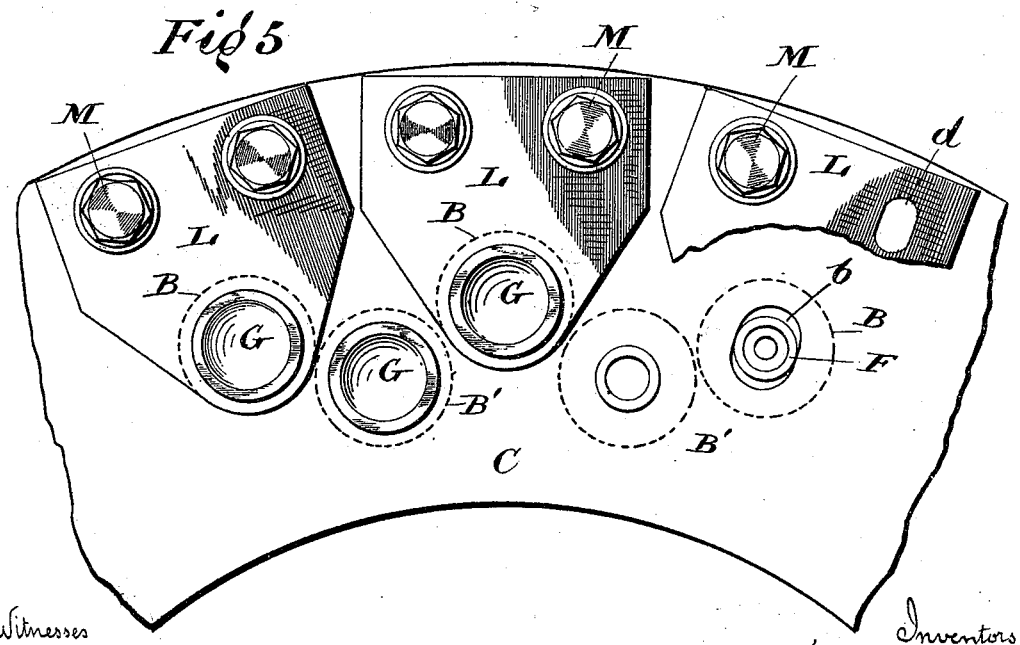
Figure 6:
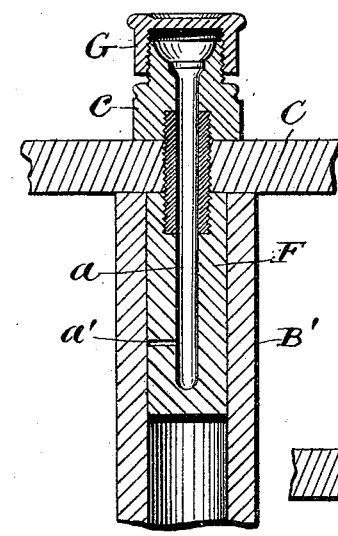
Figure 8:
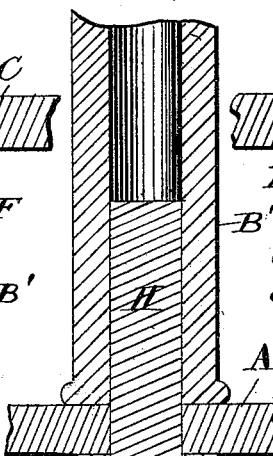
Figure 7:
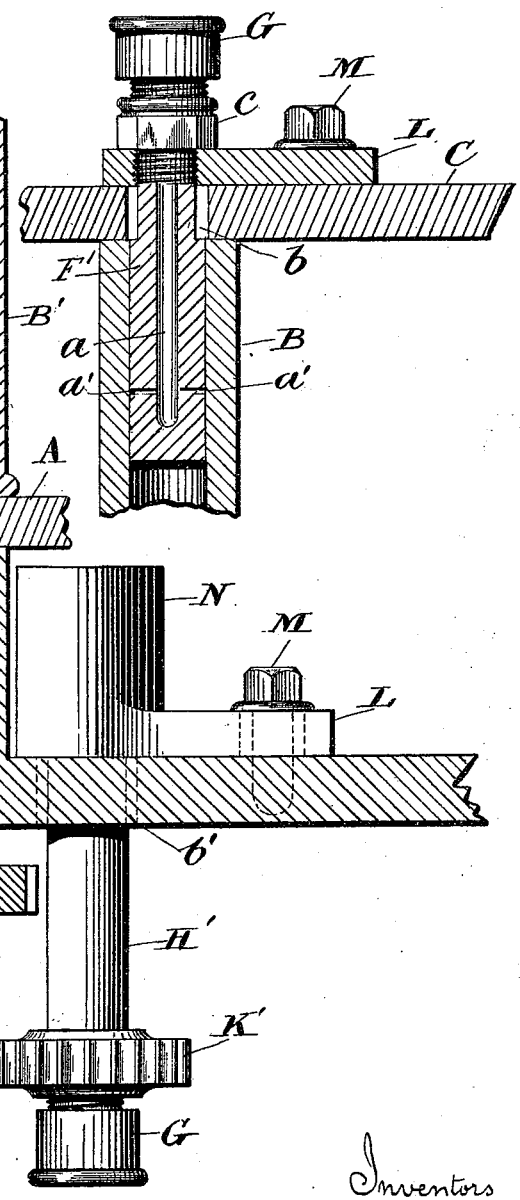

Figure 1 is an elevational view of the entire machine, a portion of which is in section upon the line A B of Fig. 2, which is a top or plan view of the body portion of Fig. 1. Fig. 3 is an under plan view of the same apparatus as it would appear if viewed upwardly, portions of which are partly broken away to show the position of the gearing. Fig. 4 is an elevational view of so much of Fig. 1, viewed from right to left, as will serve to illustrate the pump mechanism hereinafter explained. Fig. 5 is an enlarged view of a portion of Fig. 2, illustrating more fully the construction and manner of operation of the bearings of the adjustable rollers. Fig. 6 is an enlarged vertical sectional view of the upper end of the non-adjustable rollers, while Fig. 7 is a like view of the adjustable rollers. Fig. 8 is a like enlarged view, in section, of the lower end of the non-adjustable rollers and the gearing for rotating the same, which view also illustrates the lower end of the adjustable rollers and the gearing for rotating the same, partly in section.

Referring to the accompanying drawings, A is the outer case or container, which may be of any suitable metal and of any desired shape in horizontal cross-section, but preferably rectangular, and in this we prefer to mount two concentric rows or circles of solid or hollow rollers, (preferably the latter,) the whole of which may be plain faced, as at B, or provided with a helical projection, such as B″ in Fig. 1, or one row may be of one kind and the other of any desired combination of both, according to the nature or condition of the pulp, the position of the two rows and the rollers in each row being such that those in the one occur alternately with those in the other, Figs. 2 and 5.

The apparatus is provided with a top or crown plate, C, and a lower or under plate, D, both of which may be bolted or otherwise suitably connected to the casing A, and the latter, in order to elevate the apparatus the desired distance from the ground or bed plate, may be borne upon a suitable frame or upon pillars, preferably the latter, situated in any position most convenient, one of which is indicated by dotted outline by E in Fig. 1.

We prefer that the inner row of rollers B′ shall revolve upon stationary bearings, and we attain this by screwing or otherwise connecting to the under surface of the plate C spindle-like projections or gudgeons F, which dip into the upper ends of the rollers B′ and form bearings therefor, each being provided with a suitable lubricating device G, communicating with a passage $a\ a'$ in F, by which the lubricant may be conveyed to the rollers B', Fig. 6. The lower ends of the rollers B' are provided with fixed cores H, which extend downwardly through the bottom of A, and suitable bearings J, fixed upon or formed integrally with the plate D, and carry upon their lower ends pinion-wheels K and, if necessary, a lubricating-cup G.

The outer row of rollers B is adjustable, their upper ends rotating upon cores or gudgeons F', which extend upwardly through slots or apertures $b$ in the plate C, whereat they are firmly connected by nuts or their equivalents $c$ to blocks L, in each of which are formed two or more elongated slots or apertures $d$, through which pass bolts or screws M, engaging with threaded holes in the plate C, each portion F' being provided with a lubricating device G $a\ a'$, similar to the inner rollers. (Shown in Fig. 2, and more graphically in Figs. 5 and 7.) The lower ends of the rollers B would be similarly provided with cores or gudgeons H', passing down and through suitable apertures in the bottom of the case A and through bearings N, adjustable upon the plate D by bolts M and slots or apertures $d$ in the same manner as the blocks L upon the plate C at the upper ends of the same rollers and, continuing on, the said cores or gudgeons H' pass through slots or apertures $b'$ in the plate D and carry upon their lower ends pinion-wheels K' and, if necessary, lubricating-cups G.

It will be understood that by adjusting the position of the blocks or bearings L and M by means of the bolts M and slots or apertures $d$ the row or circle of rollers B may be brought closer to or farther from the rollers B' at will, the slots $b$ in C and $b'$ in D and $d$ in L and N being provided to permit such adjustment.

Although, as before stated, other motions may be employed we prefer that both rows or circles of rollers shall revolve, and that in the same direction as each other, in order that their respective faces may pass each other in opposite directions, and we carry this into effect by mounting upon the under surface of the plate D a cylindrical projection carrying a loose sleeve O, upon the outer face of which are fixed by any suitable means or formed integrally therewith toothed annular surfaces or wheel-peripheries P and P', the former of which gears with the pinions K upon the inner rollers, B', while the latter gears with the pinions K' upon the outer rollers, B, the depth of the teeth upon K' and P' being such as to permit the before-described adjustment of the outer rollers, B, without these disgearing with each other. The sleeve O would be caused to rotate by means of a worm-wheel Q, mounted thereon, gearing with a worm $e$ upon a horizontal driving-shaft R, carried in suitable bearings R' and R" and having upon either end a fast and loose pulley S, by which the same may be rotated by any suitable or available power.

Upon the upper portion of the casing A, in any convenient position, we provide a vat or chute A', communicating by an oblique passage with the interior of the casing A, and into this the pulp to be treated would be first deposited, which, passing therefrom in a tangential direction into A, would form itself into a rotary current around the outer row or circle of rollers, B, to facilitate which and to keep the pulp in a constant state of agitation to prevent coagulation we provide in A, outside the rollers B, two or more vertical rods $f$, each carrying a number of blades or projections $g$, the upper ends of said rods being borne by any convenient means, which may be that of the crown-plate C, while their lower ends extend down through the plate D and are carried in suitable bearings or foot-steps, such as $h$, upon the ground or bed plate of the machine, and the said rods and their blades may be rotated by any suitable or convenient gearing or other means—such, for instance, as by a pulley $j$, carrying a band driven by and from the main shaft R, or a shaft counter thereto and operated thereby.

The rollers having been adjusted to the cut desired and placed in motion, as hereinbefore described, the pulp deposited in A, as stated, would percolate through the spaces between the rollers B and the rollers B' and would accumulate in a strained, purified and usable condition within the inner row of rollers, B', from which it would flow through a tubular conduit T to where desired, which, as before stated, may be directly to and upon the breast-vat of the paper-making machine. A suitable tap or movable plug may be provided at the lower end or other part of T to facilitate cleaning or emptying the same. The heavy, knotty, or unusable portion of the pulp in A would sink by the action of gravity to the lower part or bottom thereof, whereat an opening $k$ would be provided, through which the said unusable pulp would pass and be periodically removed, which may be by the action of a valve intermittently operated by any convenient means; but we prefer to provide a suitable vertical force-pump V, connected to the casing A and operated as follows:

Upon a suitable duplex bearing W we mount a counter-shaft $l$, carrying a worm-wheel $m$, which gears with a worm $n$ upon the driving-shaft R. Upon one end of the counter-shaft $l$ is fixed a circular disk-crank $o$, having upon its outer face near its periphery a projecting pin $p$, which engages with the head $r$ of a horizontal rod $s$, the opposite end of which is pivotally connected to one arm $t$ of an angle-lever carried upon a suitable bearing $v$, the opposite arm $w$ of said lever being pivotally connected to the rod X of the pump V. By this means the pump would be operated upon once during each revolution of the disk $o$, and by this means we convey away the unusable pulp to wherever desired to be again treated by the beaters or otherwise according to its value.

A suitable overflow would be provided in any convenient part of A for the scum rising upon the bulk of the pulp therein.

From the foregoing description it will be understood that the most prominent feature of our invention is the employment of two preferably circular rows of parallel rollers as the straining or purifying medium; but it is obvious that a third row may conveniently be employed to extend the straining capacity of the machine, in which case we may find it convenient that the bearings of the two outer rows be adjustable, while that of the inner row would remain stationary, and in such an arrangement we may find it advantageous in the construction of the first or outer row to employ rollers having a helical projection, such as shown at B'', Fig. 1.

We wish it understood that we do not confine ourselves to the exact locality shown of the counter-shaft $l$ and its accessories for operating the pump V, nor to the exact location of the said pump, nor to the direction shown in which the pipe T, for carrying off the refined pulp, leaves the machine, nor the position of the feed-vat A', as it is obvious that where convenience of space and other considerations may render it desirable the driving-shaft R may be in some horizontal position other than that shown, so long as its worm $e$ is in gear with the worm-wheel Q, which may necessitate that the pump V and its feeding-tube $k$ and the counter-shaft $l$ and its accessories for operating the pump-gear may be located in some position relatively to the casing A other than that shown, which would or may necessitate that the feed-vat A' and the pulp-exhaust T be also otherwise located; and we reserve to ourselves the right to transpose the position of these or such other parts as may be found necessary without departing from the principle of our invention.

Having now fully described and ascertained the nature of our said invention and the manner of operating the same, we claim—

1. In combination, the tank, the two rows of vertical rolls therein alternately arranged, the upper and lower slotted plates C, D, the slots of which extend radially, the journals for the rollers extending through the slots and the bearings for said journals adjustable along the slots of the plates, substantially as described.

2. In combination, the tank, a series of vertical rollers arranged therein with screening-apertures between them, and dividing the tank into compartments, the journals for said rollers extending below the tank, means for rotating the rollers, an outlet $k$ in the tank for the unusable pulp, means for controlling the discharge of the pulp through said outlet and the connections between said means and the roller-rotating means, substantially as described.

3. In combination, the tank, the screening-rollers having lower extensions below the tank, means for rotating the rollers connected with said lower extensions, the outlet $k$ from the tank, the vertically-reciprocating force-pump V and means for operating the same consisting of the rod $x$ and connections for reciprocating the same extending from the roller-operating means, substantially as described.

4. In combination, the tank, the two rows of vertical rollers B B' therein, the upper and lower plates C, D, the gudgeons or cores F and H extending into and forming journals for the rollers B and the gudgeons F' H' extending into the rolls B' said gudgeons being carried by radially-adjustable plates on the upper and lower plates C D which are slotted to receive the adjustable gudgeons, substantially as described.

5. In combination, the tank, the concentric rows of rolls therein having gudgeons extending through the tank, the rotary sleeve O having a rack for each set of rolls, and means for turning the sleeve.

6. In combination, the tank, the rollers arranged vertically therein, and having gudgeons with pinions thereon, the rack-sleeve O having a worm-wheel Q thereon, the worm $e$ a shaft R operating the same and means for operating the shaft, said sleeve being concentric with the rows of rolls and said gudgeons for the two sets of rolls being of different lengths to engage the racks on the sleeve located one above the other.

7. In combination, the tank, the rollers, a discharge $k$ for the unusable pulp, the pump V and operating means comprising the shaft R, the worm $e$, the worm-wheel M, the counter-shaft $l$, the crank-disk Q, the rod $s$, the angle-lever connecting the rod with the pump, and means for rotating the straining-rolls comprising the sleeve O, the racks thereon, the worm-wheel Q and the worm $e$ on the said shaft R, substantially as described.

In witness whereof we have hereunto set our hands in presence of two witnesses.

THOMAS TORRANCE.
JAMES HENRY HOWELL.

Witnesses:
WILLIAM MILFORD KEMP,
LIONEL AUGUSTUS WILSON.